United States Patent [19]
Kritchman

[11] Patent Number: 6,076,706
[45] Date of Patent: Jun. 20, 2000

[54] CHILLED DRINKING WATER SUPPLY FOR AUTOMOTIVE VEHICLES

[76] Inventor: Jerold Kritchman, 18164 Laurel Leaf La., Tequesta, Fla. 33469

[21] Appl. No.: 09/203,540

[22] Filed: Dec. 1, 1998

[51] Int. Cl.[7] .................................................. B67D 5/62
[52] U.S. Cl. ................ 222/146.6; 222/180; 222/189.11; 222/481.5
[58] Field of Search ................ 222/146.6, 180, 222/189.11, 383.1, 481.5; 280/830

[56] References Cited

U.S. PATENT DOCUMENTS

| | | | |
|---|---|---|---|
| 3,642,023 | 2/1972 | Rembert | 137/209 |
| 3,850,006 | 11/1974 | Redfern et al. | 62/216 |
| 4,140,150 | 2/1979 | Rundell | 137/340 |
| 4,171,776 | 10/1979 | Pagliaro | 222/180 |
| 4,342,202 | 8/1982 | Knutson | 62/243 |

*Primary Examiner*—Joseph A. Kaufman
*Attorney, Agent, or Firm*—McHale & Slavin

[57] ABSTRACT

Disclosed is a chilled water dispenser for use in motor vehicles having a conventional air conditioning systems. The chilled water dispenser employs a bottled water holder that is secured in the trunk of an automobile. A transfer pump draws fluid from the bottle to a heat exchanger placed within the engine compartment of the motor vehicle. The heat exchanger is coupled to a conventional air conditioning system and has a thermostatically controlled solenoid to moderate reservoir temperatures. Upon demand the dispenser provides chilled water through a spigot mounted within the seating area of the motor vehicle. The heat exchanger is pre-charged with a refrigerant, allowing for ease of installation and includes fittings that allow the air conditioning system to be serviced in its ordinary manner.

18 Claims, 3 Drawing Sheets

CHILLED DRINKING WATER SUPPLY FOR AUTOMOTIVE VEHICLES

FIELD OF THE INVENTION

This invention is related to automobile vehicles and, in particular, to a chilled drinking water supply system for use in automobiles, wherein bottled water is chilled by use of the existing automobile air conditioning system.

BACKGROUND OF THE INVENTION

The advantages of having drinking water in an automobile are readily apparent. Individuals may carry water for nourishment, refreshment, to assist in swallowing medicines, or be stored in case of an emergency. Water is especially important in southern climates, where automobile temperatures are elevated by intense sunlight. Air conditioning does not eliminate the need for people to maintain liquid in their bodies and long distance travels, such as truck drivers, are remain subject to dehydration if water loss is not replenished.

Many different products are marketed for maintaining chilled water or sodas during automobile travels. For instance, insulated ice chests are available for placement within the seating area of an automobile for ease of access. However, even ergonomic style devices take up valuable seating area and pose potential safety risks. For example, when a cooler is placed in the back seat of a vehicle a driver must reach over the vehicle front seat, lessening automobile control. Additionally, if the automobile is involved in an accident, a cooler can become a dangerous projectile that may injure occupants inside the automobile. Despite the hazards involved, many individuals keep coolers and ice chests in automobiles since chilled water is a necessity for numerous occassions.

Various enhancements have been made to improve different elements of ice chests. One improvement is the advent of the thermocouple-type refrigeration system that connects directly to a 12 VDC battery and eliminates the need for a compressor. Other enhancements include U.S. Pat. No. 3,850,006 which discloses an ice chest having a built-in cooling unit with quick connects that couple directly to a car's air conditioning system. The '006 device utilizes compressed gas from a conventional automobile air conditioning system to operate a cooling unit within an insulated box. If a cooler is kept in a trunk, while the device may keep fluids cold, it is often inconvenient to use. To retrieve the stored liquids, the vehicle must be stopped and access to the trunk must be provided. This type of effort is not acceptable in many situations. For example, when fluids are needed to help a choking individual, water access must be instantaneous. The need to stop a vehicle to access water stored in the trunk is not only inconvenient, it could prove fatal. The dangers associated with stopping a vehicle along a busy highway or in high-crime areas is obvious. Fear of facing the difficulties associated with pulling over an automobile may cause individuals to delay much-needed fluid consumption. This is of special concern for elderly and young passengers who may develop heat exhaustion, or require water for consuming medicine.

U.S. Pat. No. 3,642,023 discloses a thermal drinking water supply for automobiles that uses a trunk-mounted, pressurized container to provide either hot or cold fluids into the automobile. The fluids must be brought to a desired temperature prior to filling the device and is prone to lost cooling capacity due to its placement.

U.S. Pat. No. 3,669,314 discloses an automobile-mounted hot-and-cold drink dispenser that includes a refrigeration unit to cool water and a heat exchanger to heat water. The '314 device places the storage, heating, and cooling units inside an automobile, which limits usefulness to automobiles having large cabin space.

Thus, what is lacking in the art is the ability to provide chilled water upon demand inside an automobile in a convenient and safe manner.

SUMMARY OF THE INVENTION

The instant invention is a chilled drinking water supply for installation in vehicles. The system employs a holder mounted in the trunk of a vehicle with provisions for securing bottled water thereto. This bottled water may be readily purchased from a grocery store allowing an individual to simply purchase purified water and set it into the trunk-mounted bottle holder. The bottle is secured in a fixed position by a flexible strap.

A pick-up tube is inserted into the supply bottle through a specially designed cap. The cap includes a vent and is coupled to a 12 VDC pump. Upon demand, water is drawn from the supply bottle to a heat exchanger by tubing routed either through the air conditioning ducts or beneath the automobile. The water passes through the heat exchanger and is chilled and delivered to a dispensing spout mounted within the automobile.

The heat exchanger includes an internal reservoir with copper tubing wrapped around the outside. The tubing has an inlet coupled to an existing AC liquid line, where Freon gas passes through a filter dryer and solenoid valve for insertion into a capillary tube. The drop in temperature chills the water inside the reservoir. The tubing has a discharge coupled to the AC suction line providing a closed system.

The liquid and suction tubing of the system includes a T-shaped fitting that has duplicate discharge and suction fittings wherein the air conditioning system may be serviced in a conventional manner. The heat exchanger system is pre-charged with compatible gas for ease of installation.

The heat exchanger includes a thermostat designed to shut off gas flow once the water in the reservoir is chilled to a desired temperature. Optionally, the thermostat can be wired to the AC compressor, causing the compressor to cool the water as needed. Because the heat exchange requirements are small, this type of auxiliary compressor operation would not inconvenience the occupants of the vehicle.

To help the water supply remain chilled, the tubing that extends between the heat exchanger outlet and dispensing spout is preferably routed through existing air conditioning ducts. The spout can be mounted within, or underneath, the dash and includes a push button switch electrically coupled to the bottle-mounted pump.

During use, an individual simply places a cup beneath the dispensing spout and presses the actuator switch. The actuator initiates the pump drawing water from the supply bottle for transfer to the heat exchanger reservoir. The chilled water held in the heat exchanger is displaced and delivered to the spout. A drain may be placed beneath the spout to direct excess water outside the vehicle.

Thus, an objective of the instant invention is to disclose a chilled drinking water system that uses the existing automobile AC compressor to chill water.

Another objective of the instant invention is to provide an automobile-mounted, chilled drinking water system having a universal holder that secures disposable drinking water bottles, thereby incorporating a replenishable water supply.

Still another objective of the instant invention is to disclose an automobile-mounted, chilled drinking water system that teaches the use of a water bottle holder that will hold any size or style or water bottle and can be mounted anywhere in a vehicle. Yet another objective of the instant invention is to disclose an automobile-mounted, chilled drinking water system that employs a thermostat to regulate the temperature of chilled water.

An additional objective of the instant invention is to disclose an automobile-mounted, chilled drinking water system that is pre-charged with Freon and includes connections for a conventional AC liquid and suction lines, whereby the heat exchanger can be coupled directly to a conventional air conditioning compressor system without air conditioning system modifications.

Another objective of the instant invention is to disclose an automobile-mounted, chilled drinking water system that teaches the use of a filter dryer combined with a pre-charged heat exchanger to absorb moisture and contaminants that may be introduced during installation.

Still another objective of the instant invention is to disclose an automobile-mounted, chilled drinking water system that positions transfer lines through the AC ducts, thereby maintaining water in a chilled condition before delivery.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrates various objectives and features thereof.

DETAILED DESCRIPTION OF THE PREFERRED EMBODIMENT

Figure 1:
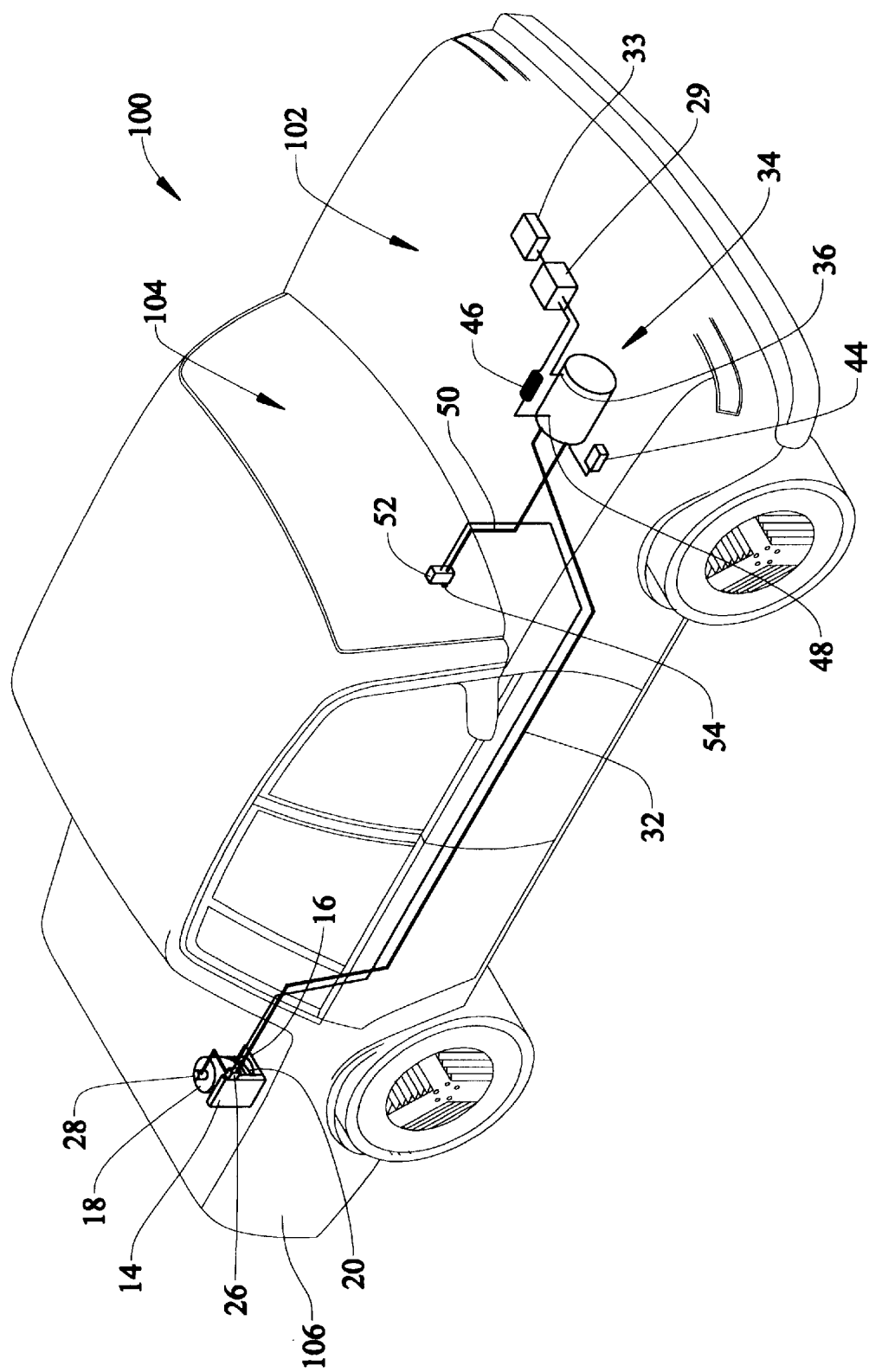
FIG. 1 is a pictorial view of an automobile having the chilled drinking water supply system of the instant invention placed therein.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Figure 4:
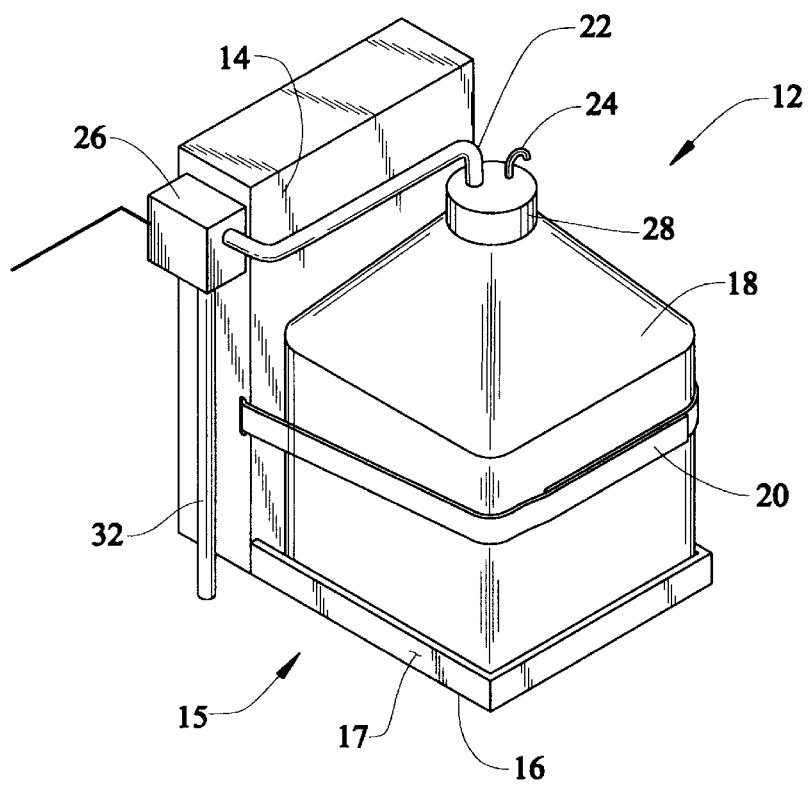
FIG. 4 is a perspective view of the bottle storage system used in the instant invention.

Now referring in general to FIGS. 1 and 4, set forth is a pictorial of a conventional automobile 100 having an engine compartment 102, a passenger compartment 104, and a trunk compartment 106. The storage system for the water includes a water bottle holder 12, having a back 14 and a base 16. The back 14 can be used for securing the holder to the rear seat, strut, or side wall of a vehicle, preferably in the trunk compartment 106. For example, the back 14 may be placed against, and permanently mounted to, the inner trunk surface of a vehicle.

Alternatively, the base 16 may be placed on a flat surface. For example, base 16 may be place onto the floor of the trunk and fastened to prevent unexpected movement of the unit 15. A strap 20 having a releasable fastening material, such as that sold under the trademark VELCRO, can be used to secure the bottle 18 to the water bottle holder 12. Additionally, the base 16 includes sidewalls 17 that cooperate with the strap 20 to secure the bottle 18. This arrangement prevents movement of the water bottle 12 during sudden stops. This arrangement also prevents bottle dislodgement during vehicle loading or unloading. It should be noted that any type of fastening means, including a buckle, a friction-type strap, or a deeper base, may be used to prevent dislodgement of the bottle 18, even without a back wall 14.

The bottle 18 accepts a modified cap 28 that accommodates a pickup tube 22 and an air vent 24. A pump 26 is secured to the back wall 14 of the water bottle holder 12; the pump draws fluid from the bottle 18 through the pickup tube 22. The air vent 24 advantageously prevents collapse of the bottle walls by allowing an inflow of air to replace water drawn out from the bottle 18. The cap 28 may be threaded or otherwise adapted to frictionally engage the top of the bottle 18; the cap prevents water spillage should the bottle be moved.

Water from the water bottle 18 is drawn into an engine-mounted heat exchanger 34, traveling through a first piece of tubing 32 that extends therebetween. The heat exchanger 34, which is mounted near the conventional air conditioning compressor 33, includes an inlet 36 and an outlet 49.

The heat exchanger inlet 36 is coupled to the air conditioner liquid line 30 by a fitting 38 that facilitates coupling during installation to avoid recharging of the AC system. Downstream from the fitting 38 is a filter dryer 40 that removes moisture and contaminants that may have accumulated in the system. The flow of gas going into the heat exchanger 34 is regulated by a cooperative arrangement of a solenoid 42 and a thermostat 44.

Gas that leaves the air conditioner compressor 29 passes through a capillary tubing 46, where it evaporates. Then, as the gas flows past the capillary tubing 46, it enters copper tubing 45 that is coiled around the of the heat exchanger 34 storage reservoir 35 to create the heat exchanger.

The copper tubing 45 is wrapped around the reservoir 35, and return line 47 leads back to the AC suction and is secured hereto by of fitting 48. It is noted that fittings 38 and 48 allow instant connection to a conventional air conditioning compressor 33. As a result, these fittings 38,48 which include stop valves, not shown, allow the heat exchanger to be pre-charged with Freon gas. Additionally, the fittings 38, 48 include auxiliary couplings, not shown, so that the AC system can be serviced in a conventional manner.

The heat exchanger reservoir 35 is sized to hold a quantity of water preferably between eight ounces and thirty-two ounces. Although reservoirs of other sizes may be used, the preferred size reservoir 35 strikes a balance between providing a quantity of water that is chilled rapidly to accommodate the standard demands from the occupants of the vehicle.

The thermostat 44 cooperates with the solenoid 42 to discontinue the flow of gas into the heat exchanger 34 when the water in the heat exchanger reservoir 35 has been cooled to a predetermined temperature. In addition, the thermostat 44 may be coupled directly to the AC compressor 33, directing operation of the compressor, when the reservoir water temperature rises above a pre-determined level. With this arrangement, the air conditioner 29 may be cycled briefly to chill the fluid in the reservoir 35, without adversely impacting the temperature of the passenger compartment 104, even if the operator of the vehicle 100 has turned off the air conditioning unit. An electric heating element, not shown, may be strung along the length of the system to prevent freezing in colder climates.

A section of outlet tubing 50 extends from the heat exchanger 34 to a dispensing spout 54, allowing pressurized water to flow from the reservoir 35 to the spout. The spout is held in place by a securement bracket 52 and includes a pump actuating switch 56. Manipulating the switch 56 engages the pump 26, causing water to flow from the storage container 18, through the heat exchanger 34, and out of the spout 54. A drain, not shown, may be provided to catch excess water from the spout 54 should a receiving cup be overfilled or removed too quickly.

The outlet tubing 50, which joins the heat exchanger 34 and the spout 54, preferably passes through the air conditioning ductwork. The air conditioning ductwork insulates the outlet tubing 50 against heat, while advantageously providing auxiliary cooling of fluid passing through the outlet tubing. With this arrangement, fluids remain chilled even after leaving the heat exchanger reservoir 35.

Figure 3:
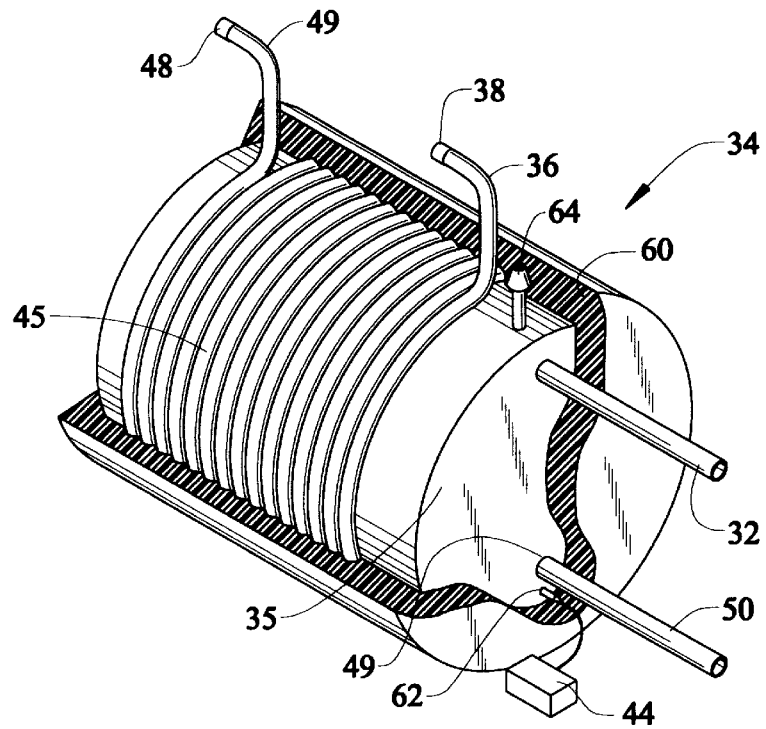
FIG. 3 is a perspective view of the heat exchanger used in the instant invention.

Reference is now made to FIG. 3, where the heat exchanger 34 is shown in greater detail. The heat exchanger fluid inlet port 36 is coupled to the supply bottle 18 by transfer inlet tubing 32; the heat exchanger fluid outlet port 49 is coupled to the dispenser spout 54 by outlet tubing 50. Fluid that flows out of the heat exchanger reservoir 35 are replaced by fluid pumped from the fluid supply bottle 18. Once inside the reservoir 35, the replaced fluid becomes chilled to the desired temperature.

Figure 2:
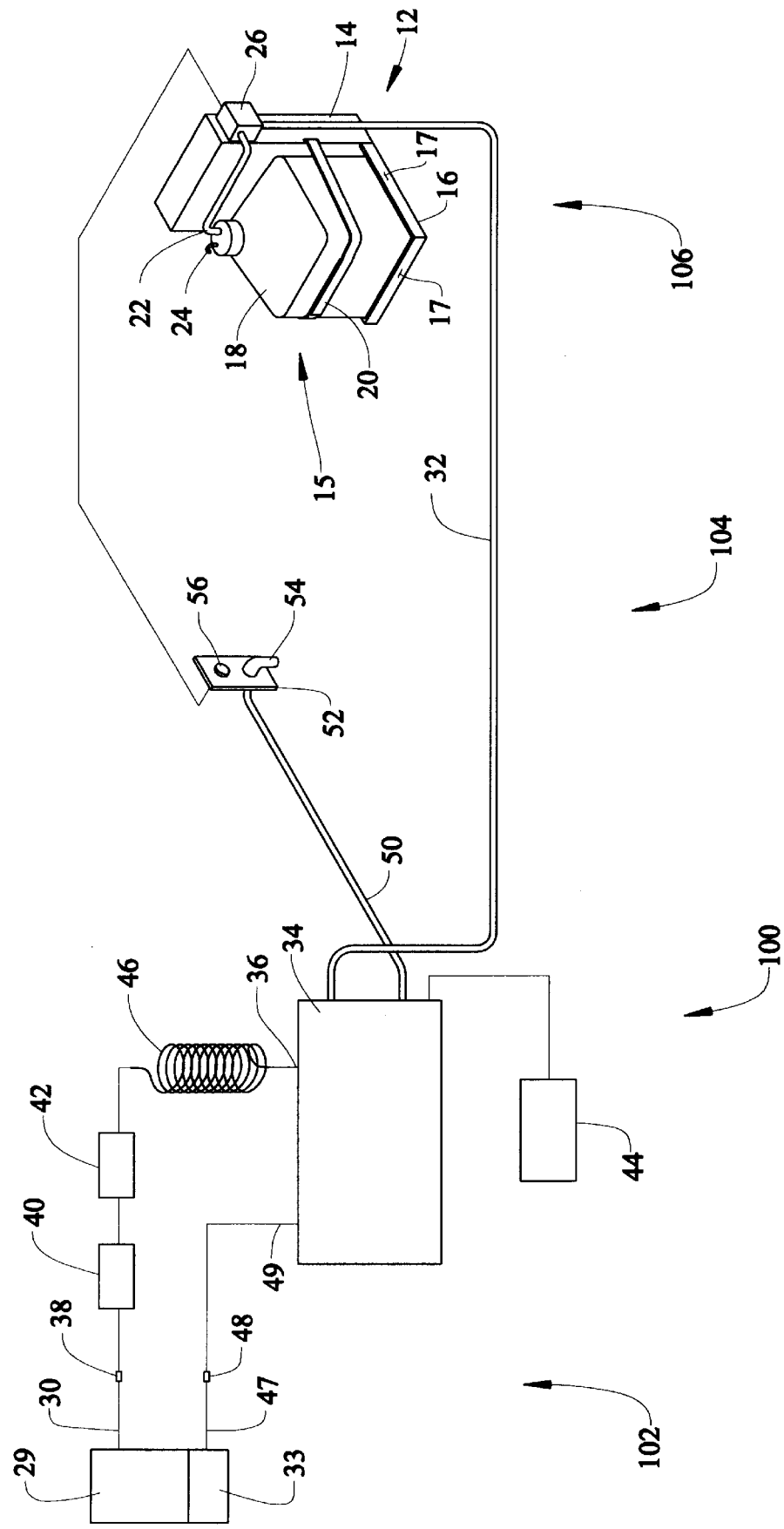
FIG. 2 is a flow diagram of the chilled drinking water supply system of the instant invention.

With continued reference to FIG. 3, and with additional reference to FIGS. 1 and 2, the capillary tubing 46 is preferably coupled to the coiled tubing 45 passing around the heat exchanger reservoir 35. In a preferred embodiment, the coiled tubing 45 is copper and has a diameter of one-quarter inch; the coiled tubing is welded in place around the reservoir 35 to optimize heat transfer. The reservoir 35 is preferably formed from a material, such as copper, that also transfers heat readily. A gas return line 47 joins the coiled tubing 45 with the suction line of the air conditioner 29.

The heat exchanger 34 is preferably secured within a housing 60 made of half-inch-thick open density rubber. The housing 60 acts as an insulating jacket for the heat exchanger 34, while advantageously protecting the coiled tubing 45.

Fluid temperature in the reservoir is monitored by the thermostat 44, which cooperates with a thermocouple 62. The thermocouple 62 may be inserted into the heat exchanger reservoir 35, for directly testing fluid temperature. The thermocouple 62 may alternatively be disposed against the exterior of the reservoir 35. The reservoir includes an air vent 64 to remove air trapped therein.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. A chilled water dispenser for motor vehicles having a conventional air conditioning system, said chilled water dispenser comprising:
   a bracket sized to support a water bottle, said bracket including a means for securing said water bottle thereto;
   a heat exchanger having a reservoir formed integrally, said reservoir fluidly coupled to said water bottle, said heat exchanger coupled to said air conditioning system and including a means for chilling water stored within said reservoir, said heat exchanger including a continuous copper tube wrapped around said reservoir with an inlet of said tubing coupled to said liquid line of said air conditioning system and an outlet of said tubing coupled to a suction inlet of said air conditioning system;
   a spigot positionable within the seating area of said motor vehicle, said spigot fluidly coupled to said reservoir; and
   a transfer pump for drawing water from said water bottle to said spigot through said heat exchanger;
   whereby a bottle of drinking water is securable to said bracket thereby dispensing chilled water from said spigot when an occupant of said motor vehicle draws water through said heat exchanger.

2. The chilled water dispenser according to claim 1 wherein said bracket is adapted to be positioned in a remote location and includes a flat base securable to the floor of an motor vehicle trunk.

3. The chilled water dispenser according to claim 2 wherein said bracket includes a back wall for securement to a side wall of a motor vehicle trunk.

4. The chilled water dispenser according to claim 1 wherein said means for securing said water bottle means to said bracket is further defined as a flexible strap.

5. The chilled water dispenser according to claim 4 wherein said strap includes a releasable hook-and-loop-type attachment.

6. The chilled water dispenser according to claim 1 wherein said coil tubing is pre-charged with a refrigerant gas.

7. The chilled water dispenser according to claim 1 including a capillary tube positionable within a portion of said coil tubing.

8. The chilled water dispenser according to claim 1 including a solenoid valve operatively associated with a thermostat for controlling the flow of gas through said tubing wherein said solenoid is opened to allow gas to flow into said tubing for reducing the temperature of said water.

9. The chilled water dispenser according to claim 1 including an electrical actuator juxtapositioned to said spigot for remote operation of said transfer pump.

10. A chilled water dispenser for motor vehicles having a conventional air conditioning system, said chilled water dispenser comprising:
   a bracket having a base plate sized to support a water bottle, said bracket including a flexible strap for securing said water bottle thereto;
   a heat exchanger having a reservoir fluidly coupled to said water bottle, said heat exchanger having a continuous copper tube wrapped around said reservoir with an inlet of said tube coupled to said liquid line of said air conditioning system and an outlet of said tube coupled to a suction inlet of said air conditioning system, said inlet of said tube having at least one capillary tube positionable therein;
   a spigot positionable within the seating area of said motor vehicle, said spigot fluidly coupled to said reservoir, said spigot having an electrical actuator juxtapositioned thereto for remote operation of said transfer pump; and
   a transfer pump for drawing water from said water bottle to said spigot through said heat exchanger;

whereby a bottle of drinking water is securable to said bracket thereby dispensing chilled water from said spigot when an occupant of said motor vehicle draws water through said heat exchanger.

11. The chilled water dispenser according to claim 10 wherein said bracket is adapted to be positioned in remotely from said heat exchanger.

12. The chilled water dispenser according to claim 10 wherein said bracket includes a back wall for securement to a side wall of a motor vehicle trunk.

13. The chilled water dispenser according to claim 10 wherein said strap includes a releasable hook-and-loop-type attachment.

14. The chilled water dispenser according to claim 10 wherein said coil tubing is pre-charged with a refrigerant gas.

15. The chilled water dispenser according to claim 10 including a solenoid valve operatively associated with a thermostat for controlling the flow of gas through said tubing wherein said solenoid is opened to allow gas to flow into said tubing for reducing the temperature of said water.

16. A chilled water dispenser for motor vehicles having a conventional air conditioning system, said chilled water dispenser comprising:

a bracket having a base plate sized to support a water bottle, said bracket including a flexible strap for securing said water bottle thereto;

a heat exchanger having a reservoir fluidly coupled to said water bottle, said heat exchanger having a continuous copper tube wrapped around said reservoir with an inlet of said tube coupled to said liquid line of said air conditioning system and an outlet of said tube coupled to a suction inlet of said air conditioning system, said inlet of said tube having capillary tube positionable therein, said coil tubing pre-charged with a refrigerant gas;

a solenoid valve operatively associated with a thermostat for controlling the flow of gas through said tubing;

a spigot positionable within the seating area of said motor vehicle, said spigot fluidly coupled to said reservoir, said spigot having an electrical actuator juxtapositioned thereto for remote operation of a transfer pump adapted for drawing water from said water bottle to said spigot through said heat exchanger;

whereby a bottle of drinking water is securable to said bracket thereby dispensing chilled water from said spigot when an occupant of said motor vehicle draws water through said heat exchanger.

17. The chilled water dispenser according to claim 16 wherein said bracket is adapted to be positioned in remotely from said heat exchanger.

18. The chilled water dispenser according to claim 16 wherein said strap includes a releasable hook-and-loop-type attachment.

* * * * *